United States Patent [19]

Reiter et al.

[11] Patent Number: 4,604,686
[45] Date of Patent: Aug. 5, 1986

[54] ASSOCIATIVE DATA ACCESS METHOD (ADAM) AND ITS MEANS OF IMPLEMENTATION

[75] Inventors: Bernadette G. Reiter, Longmont; John W. Castor, Pine; R. J. Carter Blume, Aurora; Roy A. Schewe, Boulder; Leonard D. Shepley, Littleton, all of Colo.

[73] Assignee: Martin Marietta Corporation, Bethesda, Md.

[21] Appl. No.: 574,438

[22] Filed: Jan. 27, 1984

[51] Int. Cl.$^4$ .......................................... G06F 15/16
[52] U.S. Cl. .................................................. 364/200
[58] Field of Search ................. 364/200 MS File, 300

[56] References Cited

U.S. PATENT DOCUMENTS 4,001,783 1/1977 Monahan et al. .................. 364/200

Primary Examiner—Raulfe B. Zache
Attorney, Agent, or Firm—Gay Chin; James B. Eisel

[57] ABSTRACT

An input/output driver program residing in digital computer apparatus responsive to Pascal type of software and which operates to emulate an asychronous terminal, as opposed to bisynchronous devices having defined protocols, in a distributed processing environment. The computer thus programmed is adapted to communicate with any data processor supporting external communications with other apparatus and operates as an intelligent interface between one or more user terminals and one or more data processors, of different vendor types. A user at a user terminal communicates a specific request to the interface of the subject invention which in turn automatically executes a series of Pascal computer programs, called modules, in response to a plurality of data files, called an Information Directory. These files contain all the information required to seek out, couple to and query certain predetermined data bases for specific information in their own respective logons, protocols, etc., retrieve the required information, operate on and reformat the information received in diverse forms into a consolidated file, and report the information thus integrated to the user in a user friendly form.

27 Claims, 8 Drawing Figures

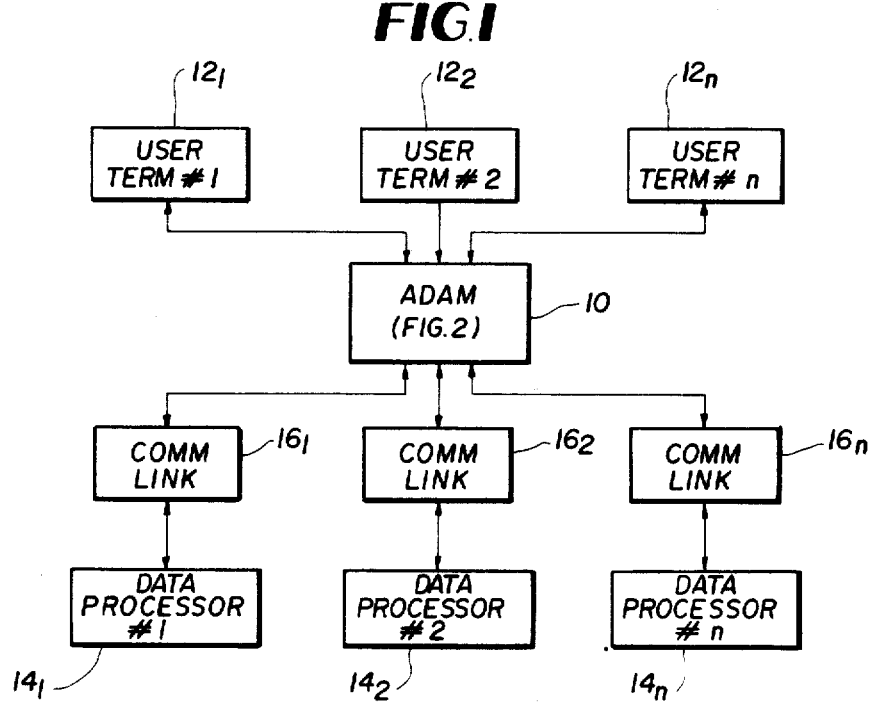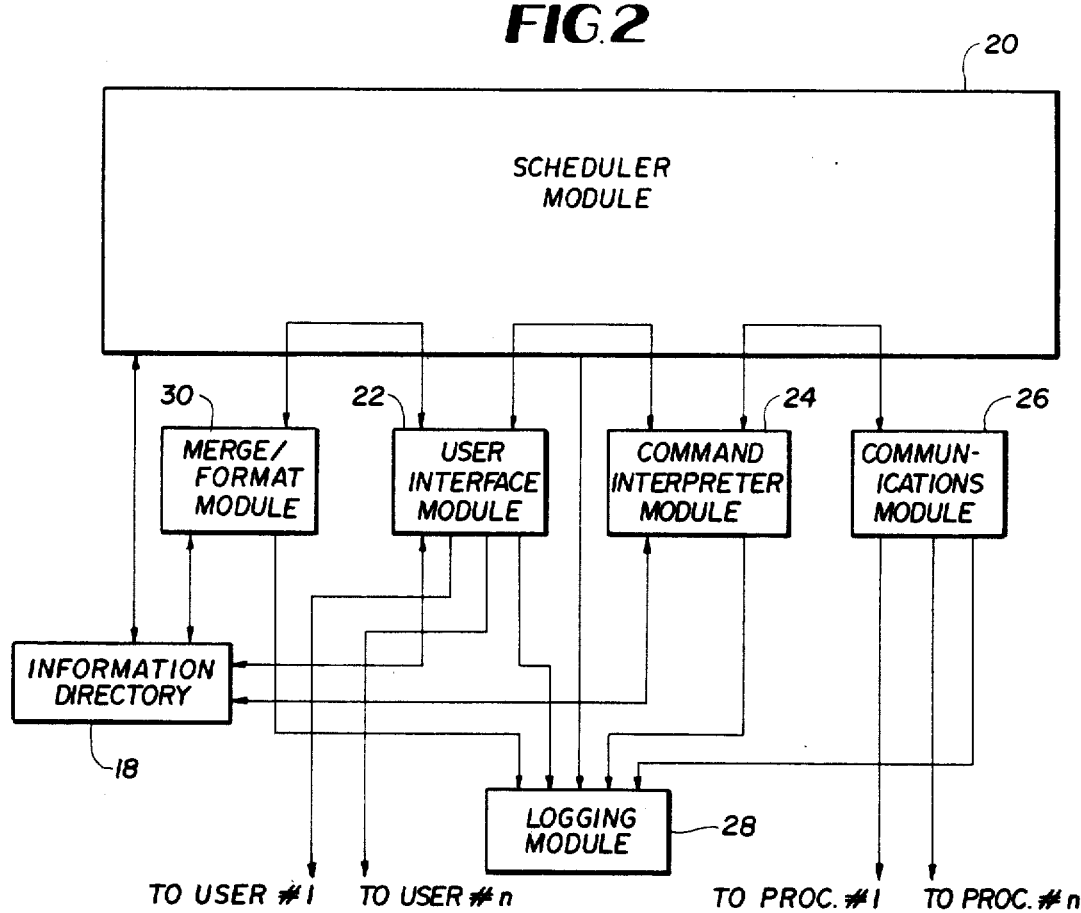

ASSOCIATIVE DATA ACCESS METHOD (ADAM) AND ITS MEANS OF IMPLEMENTATION

REFERENCED MATERIAL

Reference is made to an attached computer program listing disclosed in microfiche form. Included are 2 microfiche containing a total of 179 frames.

BACKGROUND OF THE INVENTION

1. Field of the Invention

The present invention relates generally to data retrieval from data processors and more particularly to the integration of data from data processors in a distributed processing environment.

In the present state of the art of data processors, there is no known single machine which is able to take care of all data processing needs. For example, a payroll may be run on one machine, personnel requirements located on another, and manufacturing and control inventory located on still another, thereby yielding an abundance of information which is distributed in different machines and in different formats. In order to make a business decision or update and cross reference information, it becomes necessary to integrate this information in a usable form. If one stays within a particular vendor's product line, the problem of data integration is alleviated somewhat since the same vendor normally will utilize the same type of data communications, protocols, data base managers and query languages. A serious and distinct problem exists, however, when one crosses outside a vendor's boundaries. In such instances, one must normally emulate a bisynchronous batch protocol communications system developed by IBM, for example, which requires human intervention, coordination and integration of that information upon receipt. Accordingly, where there are incompatible protocols, data base managers and query languages, each differing in capability and syntax, the problem of data integration from diverse sources comprises a very primitive and time consuming process.

It is an object of the present invention, therefore, to provide an improvement in data communications in a distributive processing environment.

It is another object of the invention to overcome communications protocol limitations in integrating data from a plurality of different data sources.

It is still another object of the invention to provide for the integration of data residing on different processors for the purpose of management information capabilities.

It is a further object of the invention to provide an intelligent interface between a user terminal and a plurality of different types of data sources.

It is still a further object of the invention to provide an interface between at least one user terminal and a plurality of data bases with the interface functioning to provide a dialogue with the data sources rather than the user terminal.

Yet another object of the invention is to provide an interface between a user terminal and a plurality of different data bases exhibiting different operational characteristics and wherein the interface emulates an asynchronous terminal to selectively access the databases in a prescribed fashion for that particular data base and thereafter integrate information retrieved therefrom.

Still yet another object of the invention is to provide an intelligent interface between a user and a plurality of data processors wherein the interface acts as a dumb terminal requiring no communications protocols and accordingly, connects to the other processors as an asynchronous terminal which extracts data therefrom with the accessed processor thinking it is a user at a terminal making the request for data.

These and other objects are achieved in accordance with a file driven computer program which resides in a computer apparatus using indexed sequential file structures controlling the execution of one or more programs. In this invention, a plurality of files are loaded with information relating to interfaces utilized with different processors, query languages, or data base managers as well as detailed item information as to data type location and its method of retrieval. In response to a user request, the files execute a plurality of programs or instruction sets called modules which operate to logon and query the required number of data processors of diverse vendor's types for specific information, extract and retrieve and read this information into a temporary file and thereafter reformat the received information into a consolidated output in a predetermined user form requested by the user such as terminal graphics or a print out.

BRIEF DESCRIPTION OF THE DRAWINGS

While the present invention is defined in the claims annexed to and forming a part of this specification, a better understanding of the invention can be had by reference to the following description taken in conjunction with the accompanying drawings in which:

FIG. 1 is a block diagram generally illustrative of a data communications system employing the subject invention;

FIG. 2 is a block diagram illustrative of the computer software utilized to implement the subject invention in a digital computer;

DETAILED DESCRIPTION OF INVENTION

Figure 3:
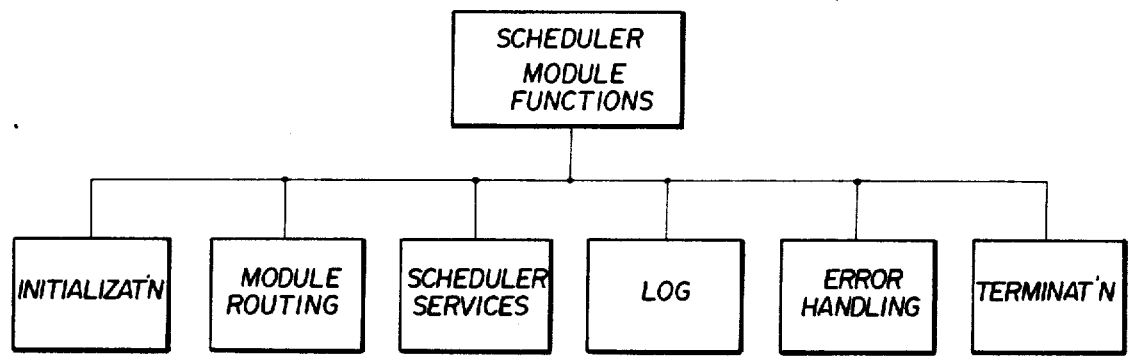
FIG. 3 is a block diagram illustrative of the functions performed by the Scheduler module shown in FIG. 2.

The present invention is implemented in a digital computer comprising a Hewlett-Packard 3000 series 44 mini-computer which is structured to operate with a source programming language known as Pascal. Pascal is a programming language well known to those skilled in the art of computing science and was first introduced in 1971 by Niklaus Wirth. The standard reference on Pascal is the text entitled, "Pascal User Manual And Report", by Kathleen Jensen and Niklaus Wirth, Springer-Verlag, New York—Heidelberg—Berlin, 1975. Another reference which may be resorted to for an understanding of Pascal type programming is a text entitled, "Pascal, An Introduction To Methodical Programming", W. Findlay and D. A. Watt, Computer Science Press, 1978.

A program written in Pascal cannot be directly performed by the hardware of a computer. To make it executable, it must be translated from Pascal into an equivalent set of machine code instructions and is accomplished by means of a compiler. Thus a computer supporting Pascal codes interrelates with three programs, i.e. the translator program or compiler, the users Pascal text or source program, and the equivalent machine code or object program. A Pascal program, moreover, is run in two distinct stages. First the Pascal compiler is brought into store and activated, whereupon it reads the source program, checks it for errors and converts it into a corresponding object program. Secondly, the object program generated from the first stage can be stored upon, for example, a magnetic disc. It is activated in turn and reads input, performs computation and writes output in exactly the manner described by the original Pascal program. Accordingly, all data presented to or taken from a computer is in the form of a text comprising a string of characters from some character set. The data comprising data which never changes is modeled in a program as "constants" whereas data which changes is modeled in a program as a "variable". A constant is created by a "declaration" while an instruction which alters the value of the variable is called an "assignment statement". An input instruction to read an item of data and store it in a variable so that it can be subsequently used in some computation is performed in Pascal notation by a "read statement", while an output instruction to get results out of the computer is performed by a "write statement". A complete Pascal program is a compilation of all the necessary definitions, declarations and statements. Moreover, the Pascal program often includes sub-programs termed functions and procedures. A function is specified in terms of a "function declaration" and constitutes a set of instructions which takes one or more given values or absence thereof and returns a resultant value to be subsequently used. A procedure, on the other hand, is a set of instructions in the form of a statement called a "procedure statement" which merely commands a set of operational steps that does not itself return a value.

The present invention involves a well known concept of file driven programming, meaning that a file controls the execution of a program. A file in Pascal notation comprises sets of data read and written by programs and which are of the same predetermined type. A number of different file structures are possible so that access to the specific data can be had by a series sequential access or direct access, depending upon the needs of the user. A file is much like an ordinary variable in that it has an identifier and is declared in a "variable declaration". For a more detailed understanding of Pascal programming language, one is directed to the above noted reference on the subject.

With the foregoing in mind, the present invention comprises a computer program expressed, for example, in Pascal notation, which resides in a computer adapted to operate in accordance with Pascal type instruction sets or codes under the control of a plurality of expandable files. Referring now to FIG. 1, the subject invention is depicted in block diagram form as an associative data access method (ADAM) interface 10 which is coupled between a plurality of user terminals $12_1$, $12_2$ . . . $12_n$ and a plurality of diverse type data processors such as data bases $14_1$, $14_2$ . . . $14_n$ each having different characteristics such as protocols, logons, data base managers, and query languages which sits on top of the data base managers. Coupling between the various data bases $14_1$, $14_2$ . . . $14_n$ is made by way of respective bi-directional communications links $16_1$, $16_2$ . . . $16_n$ which may comprise, for example, modems. Modems are well known devices for coupling data processors via telephone lines. The ADAM interface 10, as will be shown, operates as an asynchronous terminal and appears to the various data bases $14_1$, $14_2$ . . . $14_n$ as one of the user terminals $12_1$, $12_2$ . . . $12_n$ to access the data bases for specific information.

The ADAM interface 10 contains instructions which are contained in a plurality of files called an Information Directory 18 (FIG. 2), which are read and executed by a number of programs which emulate the required dialogues of the respective processors and data bases so that the data needed can be retrieved, integrated, formatted and outputted in the form of graphs, charts, and/or reports specifically geared to the needs of the user terminal making the request for information to the interface. Thus, each of the data bases $14_1$, $14_2$, $14_n$ is made to believe that it is in communication with a user, but in reality it is in communication with the ADAM interface 10. A user at one of the terminals $12_1$, $12_2$ . . . $12_n$ simply makes a request to the interface 10 for specific information which is to be presented in a predetermined form, whereupon the ADAM interface 10, knowing where the specific information resides, sequentially or parallely couples to all the required data bases while mimicking an asynchronous terminal and provides a dialogue to each processor and data base without human intervention to recover the data desired.

Referring now to FIG. 2, there is shown in block diagram form, software components of a Pascal program residing, for example, in a Hewlett-Packard 3000 series 44 mini-computer, not shown, including a plurality of input/output ports, also not shown, for establishing a signal transmitting connection between at least one user terminal $12_i$ and at least one data base $14_i$ via its respective communications link $16_i$. The software components, called "modules", of the Pascal program include: a Scheduler 20, a User Interface 22, a Command Interpreter 24, a Communications module 26, a Logging module 28, and a Merge and Format module 30. The Scheduler module 20 contains a "global statement" which controls the operation of the remaining modules 22 through 30. Before considering the functions of the various modules, the Information Directory 18 will be first considered.

The Information Directory 18 comprises an indexed sequential file structure which is operable to develop a plurality of separate sets of instructions called files. The files of the Information Directory 18 contain the following types of information: (a) user information comprising who the accessing user is, user passwords, the user access capabilities, etc., data categories available to a particular user, the language dialogue with a particular user such as English, German, Spanish, etc. and being tailored to the user's requirements; (b) interface formation comprising how to connect to the data bases such as local area network access, autodial, etc., the particular logon information to the data bases where the data resides, passwords and user identification to logon in order to access the data and processor logoff information; (c) data retrieval information comprising information on the structure of the data to be retrieved (IMS, IMA, GE, ORACLE, sequential files, etc.), the query language available to access the data and the requirements to access or invoke and format a data FIND, request for the query language; and (d) data manipulation and output format information comprising algebraic equations to be applied against the data retrieved, the manner in which to format data into a report format, the manner to summarize the data, the manner to format the data graphically and the manner to format the data in a verbal format audio output. The Information Directory 18 is adapted to maximum flexibility in growth and easy integration into new hardware and software technologies as they appear on the market.

The Information Directory 18, for example, comprises six files. File No. 1 comprises a Security File which contains the user name, password, the next module to be executed and the first command to be executed. File No. 2 comprises what is termed a Menu file which contains screen images for a plurality of menus for the specific user terminals $12_1, 12_2 \ldots 12_n$ and which may be respectively different, with each menu being indicative of what can be obtained at each user terminal. File No. 3 comprises a User Command Stream File which contains the sequence of instructions to be followed when a specific menu request is made from a user terminal. File No. 4 comprises the Application Command Stream File which contains the processes necessary to complete a logical task. A "process" comprises one or more instructions which when executed will accomplish a logical task. File No. 5 comprises a Condition File containing entries which compare incoming data against expected data, compare an internally maintained counter to a value that is specified in this file and upon successful comparison, it dictates further processing by specifying the next module and command associated with the particular comparison. And finally File No. 6 comprises a Graph file which contains the information needed for the generation of a predetermined graphic output for the integrated data obtained.

Turning now to the modules of FIG. 2, the Scheduler 20 comprises a Pascal program or set of instructions which performs the functions of opening and closing the Information Directory files, miscellaneous initialization and termination tasks, provides storage for the other modules 22 through 30 through a common linkage, executes the other modules based on the value outputted from the Information Directory, various services required by other modules during execution, logs information, controls error conditions encountered in the Scheduler module, and terminates execution of the program upon completion of a user request. As shown in FIG. 3, these functions can be categorized as INITIALIZATION, MODULE ROUTING, SCHEDULER SERVICES, LOG, ERROR HANDLING and TERMINATION. In the INITIALIZATION stage, all the files of the Information Directory 18 are opened. Initialization of storage takes place, as well as any other miscellaneous initialization tasks required including the formatting of parameters of the Pascal code. Following this, the MODULE ROUTING function takes place whereupon the User Interface 22, the Command Interpreter 24, the Communications 26, the Merge/Format 30 modules are executed based on a module parameter (PARM) formatted in the INITIALIZATION stage.

The SCHEDULER SERVICES function provides various capabilities to the other modules during execution. A service is performed when an executing module requests the Scheduler (via the "next module" and "command" variables) to perform the task. The Scheduler performs the task, and immediately returns control to the module that requested the service. The services provided include: execute a system-level command, open and close non-Information Directory files, programmatically execute another program, display a status message, compare incoming data with "expected" data (stored in the Condition File), and manipulate a series of switches which control diagnostic (debug) messages. The LOGGING INTERFACE function executes the Logging module 28 sub-program based upon the current logging requirements (minimum requirements comprise an ADAM user's session beginning and ending). The ERROR HANDLING comprises each error condition being detected and an appropriate message being displayed on the user's terminal screen. Finally the TERMINATION function closes the files, performs any other miscellaneous termination tasks and terminates the program. The Scheduler module 20 is the only module continually executing in response to the Information Directory 18 during the course of an operational phase. All the other modules 22 through 30 are executed individually as sub-programs of the Scheduler program.

Figure 4:
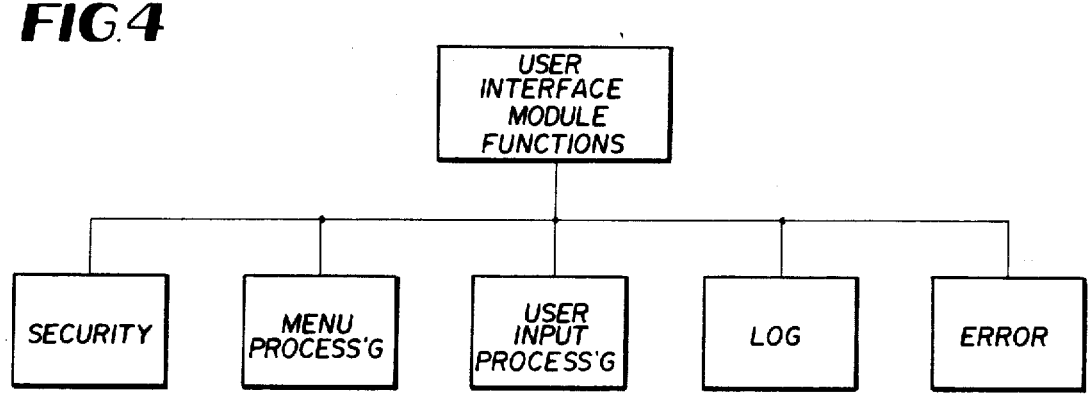
FIG. 4 is a block diagram illustrative of the functions performed by the User Interface module shown in FIG. 2.

The User Interface module 22 is a Pascal program responsible for all input and output to and from the user terminals $12_1, 12_2 \ldots 12_n$. Its functions typically involve password validation of the password communicated from a user terminal $12i$, display of a primary menu (predetermined selected data type available to a particular terminal) allowing a user to request a particular application, display of an application menu (subheadings of data available to a particular terminal $12_j$), triggering a communications data capture process and output menu processing. As shown in FIG. 4, the User Interface module functions include a SECURITY function which is indicative of the fact that the User Interface module 22 accesses the Security File contained in the Information Directory 18, which contains valid passwords for each user. The User Interface module 22, upon accessing the Security File, validates the password. Since the Security File in the Information Directory 18 also contains the name of the first command to be executed (typically, "Display a Menu") upon validation, the MENU PROCESSING function of FIG. 4 is indicative that the User Interface module 22 accesses the Menu File in the Information Directory which contains screen images of the pertinent menus for a validated user terminal $12_i$. The User Command Stream file in the Information Directory 18 contains a sequence of instructions for a given menu response. The User Interface module 22 additionally includes a USER INPUT PROCESSING function shown in FIG. 4 which determines the entry point into the Command Stream file in response to a menu selection by the user at his user terminal $12_1 \ldots 12_n$. The Command Stream file will be directly accessed using that response from the user terminal as a key and entries will be serially processed from that point, each triggering one of a given set of instructions such as "display another menu", "pass control to another module process", "capture communications data" or "exit". After reading a record, the User Interface module 22 will interpret the "next module" portion of the record. If the "next module" is the User Interface itself, it will execute the command and read another record from the appropriate file (the command executed may have instructed the User Interface to "bring up a menu", in which case the current file will have changed from the User Command Stream File to the Menu File). If "next module" is not the User Interface, it will store "next module" and the remaining record in global variables and return to the Scheduler, allowing routing to the appropriate module. The User Interface module 22 also includes a LOG function, which accesses the Logging module 30 at the appropriate times. The ERROR HANDLING function comprises each error condition being detected and an appropriate message being displayed on the user's terminal screen. The interaction of the MENU PROCESSING and USER INPUT PROCESSING functions provides the user with input/output capability as well as providing a graphics and report interface to the user terminals $12_1$, $12_2$ . . . $12_n$ via the input/output ports of the mini computer containing the subject software package.

Figure 5:
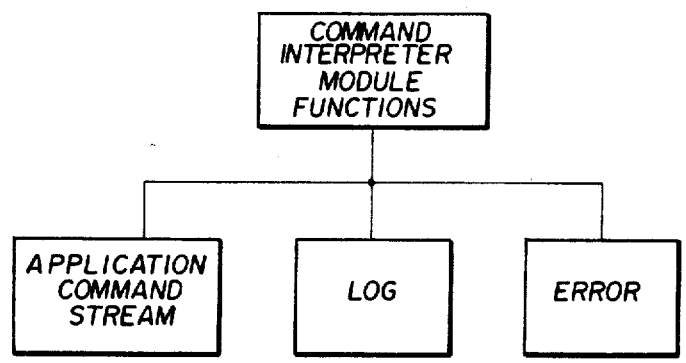
FIG. 5 is a block diagram illustrative of the functions performed by the Command Interpreter module shown in FIG. 2.

The Command Interpreter module 24 comprises a Pascal program which reads and expands the Application Command Stream file in the Information Directory 18 causing the other modules to perform specific tasks via the Scheduler module 20. As evidenced by the block diagram of FIG. 5, the Command Interpreter module 24 functions include accessing the Application Command Stream file. The records accessed in the Application Command Stream file are grouped into "processes". Each process consists of records which collectively accomplish a task. Control structures built into the command language at the Information Directory files 18 can cause execution of different processes, providing both "PERFORM" and "GOTO" capability, meaning execute the process and return to the calling process, or execute the process and do not return to the calling process, respectively, as well as other necessary control structures. The Command Interpreter, after reading each record, interprets the "next module" portion of the record and determines which module should perform the remaining instruction. If the "next module" is the Command Interpreter itself, it will execute the command and read another record. If "next module" is not the Command Intpreter, it will store "next module" and the remaining record in global variables and return to the Scheduler, allowing routing to the appropriate module. This is evidenced by the block of FIG. 5 entitled, APPLICATION COMMAND STREAM. Additionally, the processing of errors is performed by the Command Interpreter module 24 which are logged into the log file by calling the Logging module 28 as evidenced by the functional blocks ERROR and LOG of FIG. 5.

The Communications module 26 comprises a Pascal program which executes elementary commands to handle communications with the multiple data processors $14_1$, $14_2$ . . . $14_n$ of FIG. 1 where the data requested by a user terminal $12_i$ resides. The Communications module 26 makes the ADAM interface 10 appear as if it were the user terminal $12_i$ itself accessing the data processors. It controls and initiates input and output to the data processors $14_1$, etc. by emulating an asynchronous terminal to the data processors; however, the dialogue with the data processors will be controlled by elementary commands stored in the Application Command Stream file in the Information Directory 18.

Communications with the data processors $14_1$ . . . $14_n$ to be accessed is preferably in a TTY mode which implies no special character or screen addressing type characters need be interpreted, thus simplifying communications requirements since data can be dealt with on a line basis rather than on a screen image basis. The Communications module 26, moreover, includes input/output routines which handle read/write requests to a data processor port and will receive various information from the Command Interpreter module 24 via the Scheduler module 20 to determine such things as what to read, when to read, when the read is complete and the time tolerated before read is aborted. Physical connection to a data processor $14_1$, $14_2$ . . . $14_n$ is shown in FIG. 1 accomplished by means of respective communication links $16_1$ . . . $16_n$. These communications links preferably comprise an autodial-modem connection; however, when desirable connection may be made through a local area network (LAN) network. In the autodial-modem approach, the Application Command Stream file will contain the required phone numbers and sorting sequence if "busy", instructions necessary to check for busy call pause and retry or abort conditions if unsuccessful after a predetermined number of retries and information to issue appropriate character to get the attention of the particular data processor once a modem, not shown, on the processor has answered. The Communications module 26 will then issue a sequence of statements to logon or logoff of the data processor captured, define the elementary commands necessary to logon to the processor in question, issue the code necessary for logon and issue the logoff statements and read the logoff acknowledgment. Additionally, definitions are generated as to what constitutes "data" and what is "not data" and then establishes communication with the correct query packages for the particular data processor captured. This entails defining commands in the Information Director 18 and the sequence of events which are scheduled to comeback in the event of successful involution of the accessed data and includes the software necessary to communicate with the appropriate data ports and the command sequence to initiate selection of data from the accessed data processor.

Figure 6:
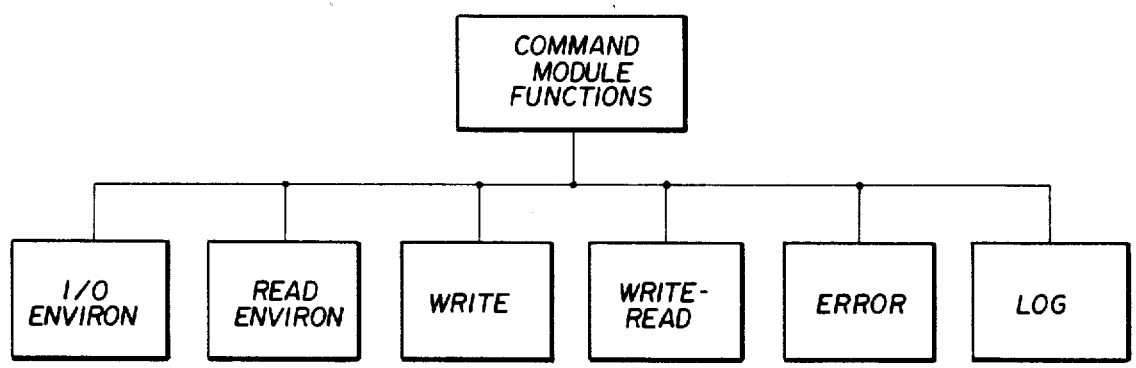
FIG. 6 is a block diagram illustrative of the functions performed by the Communications module shown in FIG. 2.

The Communications module 26 acts first of all as shown in FIG. 6, to establish the prescribed input/output environment between itself and a particular data processor $14_1$, etc. This is shown in FIG. 6 by the block entitled I/O ENVIRON. Data is stored in the Information Directory 18 which describes the communication environment which each data processor $14_1$ . . . $14_n$ will use whereupon the Communications module 26 uses the data to modify the ADAM interface 10 so that it can communicate properly with a particular data processor $14_i$ and to condition the input and ouput data. This data includes the file name, the parity and baud rate used, the terminal type, the end of record character, and a flag so that the program will know whether to append a carriage return character to the end of a transmission string. Also, the Communication module 26 functions to generate the read environment indicated by the block READ ENVIRON of FIG. 6 to maintain and store the data used by the READ routines. This includes the read termination string information, the time i.e. number of seconds the READ command should wait for input from a captured data processor before aborting and the maximum number of "reads" to be executed before aborting. Also included is the information required to store the input received by the captured data processr. Next a WRITE function is provided by the Communications module 26 which writes the text which is passed to the port of the captured data processor. Next a WRITE-READ function writes the text which is passed to a specified port of the captured data processor and posts a READ to that port and if no message is received after a specified time, an error is reported and logged. If, however, a message is received, READ TERMINATION condition is next tested. If it is met, a normal exit is made from the Communications module 26. If a READ TERMINATION is not satisfied, a test is made to see if the input should be stored and if the answer is in the affirmative, the message is stored. If the number of reads exceeds a maximum number specified, the module aborts further data retrieval. As in the case of the Command Interpreter module 24, the Communications module 26 also functions to provide Error Handling and logging to the Logging module 30 as evidenced by the blocks ERROR and LOG of FIG. 6.

Figure 7:
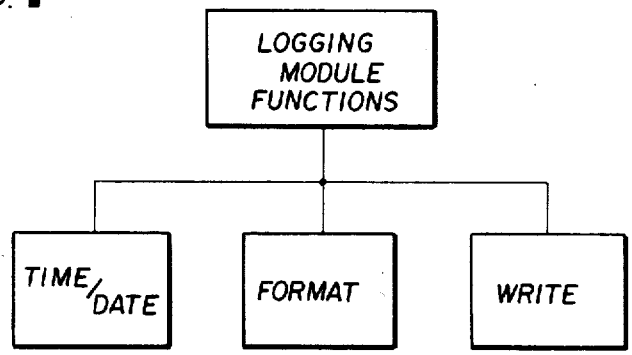
FIG. 7 is a block diagram illustrative of the functions performed by the Logging module shown in FIG. 2.
Figure 8:
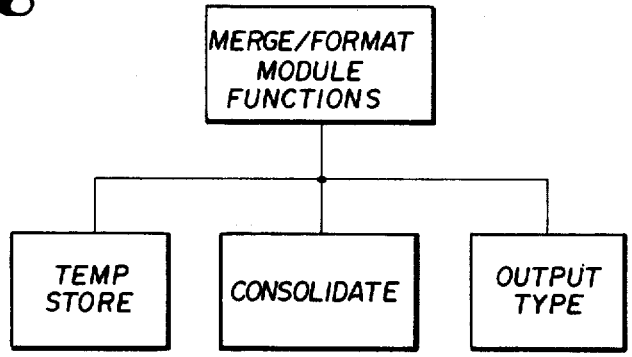
FIG. 8 is a functional block diagram illustrative of the Merge and Format module shown in FIG. 2.

The Logging module 28 is a Pascal program which performs, as is already evident, the functions of recording the status of the complete program's execution as it progresses in a log file which is a key sequential access (KSAM) file which contains records written in chronological sequence by the Logging module which as shown in FIG. 2, can be called by all other modules 20 through 30. The logging function is switch selectable and may be displayed when desirable. As evidenced by FIG. 7, functions to identify the user, the time and date the module being logged and the writing of text into log file. These are shown by the blocks TIME/DATE, FORMAT an WRITE.

Finally, the MERGE/FORMAT module 30 comprises a Pascal program executed by the Scheduler module 20 and functions in accordance with the TEMP STORE, CONSOLIDATE and OUTPUT TYPE blocks to temporarily store the data retrieved from the accessed data processors $14_1 \ldots 14_n$ via the Communications module 26, consolidate the data retrieved in a common format, and output the data in a predetermined manner dictated by the user terminal through the Menu file and User Command Stream file contained in the Information Directory 18.

Thus ADAM 10 comprises a driver program whose executing functions and data retrieval capabilities are totally driven by the information in the Information Directory 18 and all of the information in the Information Directory is logically connected to users' identity through a pointer into the six various index sequential files, referred to earlier, which collectively make up the Information Directory.

The following is intended to provide an overview of the operation of the ADAM interface 10 and the manner in which it interacts with a user having access to a user terminal $12_i$ and two different data processors $14_1$ and $14_2$, for example, respectively comprising a Hewlett-Packard (HP) located in one city and an IBM data processor (IBM) located in another city. First of all, the user who, for example, may be a financial controller identifies global information requirements such as: overhead dollars, work in progress, contracts outstanding, and contracts scheduled. He also defines specific information within these areas such as: department number, badge number, labor rate, etc.

The user (financial controller) further provides his information requirements to an information manager who has the background and knowledge of where the data resides, what its format is, and now to access the data. This information manager, in response to the financial controller's needs, then enters all of the following information into the six files of the Information Directory 18. He enters, among other things, a user dialogue/menu for the user's customized terms that will be used later by the user to access his information from the plurality of data processors where the data resides. The information manager will also load the communications information such as local area network (LAN) access commands or autodial modem controlling commands. Logon information, user identification on the remote data processors and the passwords are also entered together with all information to retrieve remote data such as information on how to invoke, for example, RAMIS, how to access commands through RAMIS, what is expected back as valid data, how long should it take to get the data back from the remote processor, format of data returning to the ADAM interface 10, etc. Reformatting information is also entered which enables the data retrieved to be displayed to the user in a predetermined fashion. Additionally, information on how to access different types of terminals is also entered by the information manager such as how to format data for audio stations, different vendor's terminals, different vendor's graphics terminals, etc. Once all this informaion has been loaded into the files of the Information Directory of ADAM 10, the user is in a position to retrieve specific data contained in diverse types of data processors $14_1 \ldots 14_n$ remotely located not only from the user terminal, but from each other.

The following dialogue is intended to illustrate the interaction between a user at a user terminal $12_i$, and the operations taking place with the ADAM interface 10, hereinafter referred to simply as ADAM, during a data retrieval session.

The user logs on to the ADAM interface through his user terminal by entering:

ADAM

The video display responds with screen displaying:

ADAM IS BEING INITIATED

ADAM proceeds afollows:
The Initiation Procedure starts whereupon the Scheduler Module 20 clears the screen, opens all files of the Information Directory (I.D.) 18, initiates COUNT, COMMAND INTERPRETER and COMMUNICATION variables which are sent to the User Interface Module 22 and sends a START mnemonic (identification of processing to be performed by a module) to the User Interface Module 22. The Scheduler Module 20 loads the user's name into a global variable which is accessible to the User Interface Module 22. The name is used as a key into the Security File of the I.D. The User Interface Module 22 then prompts the user terminal for a password.

The screen displays:

PLEASE ENTER PASSWORD:

The user responds with, for example:

EVE

ADAM next does the following:
The password is checked against the password in the I.D. Security File. If the password is not valid, the user terminal is reprompted for the correct password. If the password is valid, the remaining contents of the Security File are used as the first command that is passed to the Scheduler Module 20. In this example, the User Interface Module 22 next prints a "Primary Menu", which is stored in the Menu File of the I.D. 18.

The User terminal screen next presents a Primary Menu display such as:

ADAM

PRIMARY MENU

1. MIS
2. WORD PROCESSING
3. MAIL
4. REMOTE HOST
5. BYE

Please make selection:—The user responds, for example, with:

"1"

ADAM accordingly continues:
The User Interface Module 22 evaluates the answer through the entries and commands connected to that response stored in User Command Stream File of the I.D. 18. Using a key mnemonic MENU, the User Interface Module 22 returns to the Menu File and prints an "ADAM MIS Menu" on the user terminal screen, it being understood that "MIS" stands for "Management Information System".

The screen then portrays the MIS MENU as follows:

ADAM

MIS MENU

1. WIP BUDGET vs. ACTUALS
2. BYE

Please make selections:
The user responds, for example, with:
"1"

ADAM in turn continues processing in the following manner:
The User Interface Module 22 evaluates the answer through the entries and commands connected to that response stored in the I.D.'s User Command Stream File. Using the key mnemonic MENU, the User Interface Module 22 returns to the Menu File of the I.D. and asks the user for entries of MAN and CLASS OF COST related to the WIP BUDGET vs. ACTUALS menu. The screen then portrays the following:

ADAM

MIS MENU

1. WIP BUDGET vs. ACTUALS
2. BYE

Please make selection: 1
MAN:
CLASS OF COST:

The user then enters a plurality of numbers, for example, 203123 after MAN: and 01 after the CLASS OF COST:

The screen then displays:

ADAM

MIS MENU

1. WIP BUDGET vs. ACTUALS
2. BYE

Please make selection: 1
MAN: 203123
CLASS OF COST: 01

ADAM now operates to retrieve BUDGET vs. ACTUALS data from the remote processors HP and IBM in the following manner:
The User Interface Module 22 evaluates a mnemonic PARMREAD (i.e. read parameters) As a result it reads the terminal input for MAN and CLASS OF COST and stores these values in a PARAMETER table. It then looks to User Command Stream File of the I.D. 18 for instructions describing the flow of processing that needs to be followed to emulate and access the HP processor for the data sought. Control is returned to the Scheduler Module 20 which calls a COUNTER procedure which resets a program counter. The Scheduler Module 20 returns control to the User Interface Module 22, which reads the next record in the User Command Stream File. This record indicates a Command Interpreter command so control is returned to the Scheduler. The Scheduler Module 20 using a MODULE ROUTING procedure calls the Command Interpreter Module 24. The PROCESS mnemonic causes a HPWIPBUDGET process to be executed to access the HP data processor. Instructions for the HPWIPBUDGET process are stored in the Application Command Stream File of the I.D. Next alternating mnemonics direct the flow of processing through different modules but always through the MODULE ROUTING procedure in the Scheduler Module 20. The Test Condition file in the I.D. is also called at appropriate times to check the progress of logging on, query, and data retrieval. When retrieval is completed, the Scheduler Module 20 calls a XCOUNTER procedure which resets the program counter. The Command Interpreter module 24 reads the last record in the HPWIPBUDGET process, and recognizes that it should return to the User Interface module 22. The User Interface, via the Scheduler module 20, reads the next record in the Use Command Stream File. The record indicates that the Command Interpreter module 24 should next be executed, so the User Interface module 22 returns control to the Scheduler module 20, which routs control to the Command Interpreter module 24.

The Command Interpreter module executes the "PROCESS" mnemonic, and the IBMWIPBUDGET process is next executed. This accesses the IBM data processor in the same manner as the HP processor but now emulating an IBM dial-up terminal. Instructions for IBMWIPBUDGET are also stored in Application Command Stream of the I.D. During processing of the IBMWIPBUDGET process, the pertinent query files are activated and used for the data retrieval from the IBM data processor. The Test Condition File is called to check the progress of logging on and data retrieval. The Test Condtion File will have specific instructions for ADAM to follow (Retry loop, Quit, etc. . . , all with appropriate error messages retrieved from the Application Command Stream File of the I.D.). After successful completion of the IBMWIPBUDGET process, the Scheduler module 20 directs the flow of processing through its Module Routing procedure to the User Interface module 22, which reads the next record in the User Command Stream File of the I.D. 18. A MENU mnemonic causes the User Interface Module 22 to return to the Menu File and portray "ADAM MIS OUTPUT MENU" on the screen. The screen then displays an Output Menu as follows:

ADAM

MIS OUTPUT MENU

1. WIP BUDGET vs. ACTUALS REPORT
2. WIP BUDGET vs. ACTUALS HOUR LINE GRAPH
3. WIP BUDGET vs. ACTUALS HOUR BAR CHART

4. WIP BUDGET vs. ACTUALS DOLLARS LINE GRAPH
5. WIP BUDGET vs. ACTUALS DOLLARS BAR CHART
6. BYE

Please make selection:
The user then responds with, for example:

"1"

Processing in ADAM then continues per the following: The User Interface Module evaluates the answer and looks for instructions in the User Command Stream File of the I.D. The Scheduler Module 20 activates Command Interpreter Module 24 whereupon a PROCESS mnemonic calls upon the Merge/Format Module 30. The Merge/Format Module reformats the data retrieved from both the HP and IBM data processors by writing out a new file in a new format. This includes consolidating multiple input records into one output record. After successful completion of the merging procedure the Scheduler Module 20 executes a CREATE mnemonic. The Scheduler calls a XCREATE procedure and programmatically runs a program that prepares a report using data formatted by Merge/Format Module 32. All other procedures within ADAM are suspended and the report is written on the user terminal screen. When desirable, it can be printed out in text form on a printer, or in graphic format on a terminal or plotter.

A STATUS mnemonic next prompts the Scheduler Module 20 to display a message.

The Screen next displays a command:

HIT SPACE BAR FOR NEXT MENU OR SAY BYE

The user then typically responds by entering "BYE" on his user terminal.

The User Command Stream File of the I.D. 18 instructs the Scheduler Module 20 to pass control to the User Interface Module 22. The User Interface Module generates a CLEAR mnemonic and clears the user terminal screen. An EXIT mnemonic causes a NEXIT procedure in the Scheduler Module 20 to execute. The ADAM session will terminate with the logging module 28 being advised, the Information Directory files are closed, and "END OF PROGRAM" is commanded to be portrayed on the screen. The screen then displays:

END OF PROGRAM

Thus what has been shown and described is an intelligent software interface acting as a dumb terminal requiring no communications protocol and which is able to atomatically connect to diverse type data processors as an asynchronous terminal and extract data therefrom, with the processor "thinking" it is a user at a terminal making the request, and accordingly can access different data processors such as data bases for certain information contained therein, retrieve and integrate the information and reformat it into a composite file and display it to the user in a manner requested without human intervention.

While there has been shown and described what is at present considered to be a preferred embodiment of the subject invention, it is to be noted that the same has been made by way of illustration and not limitation. Accordingly, all modifictions, alterations and substitutions may be made without departing from the spirit and scope of the invention as set forth in the appended claims.

1. A method of integrating data in a distributed processing environment, comprising the steps of:
   (a) coupling at least one user terminal to a plurality of mutually diverse type data processors through an intelligent interface;
   (b) loading said interface with information for coupling to and retrieving data from each of said data processors;
   (c) operating said interface as an asynchronous terminal, thereby emulating a dumb terminal, in accordance with said information loaded therein and selectively coupling to and accessing said data processors for predetermined data via a communications link;
   (d) retrieving and returning said predetermined data to said interface via said communications link;
   (e) integrating said data retrieved from said plurality of mutually diverse type data processors at said interface comprising the steps of consolidating the data received from said diverse type processors and reformatting the data into a common format following said consolidating step; and
   (f) reporting said data thus integrated to said user terminal in a user friendly form.

2. The method of claim 1 and further including the steps of:
   (g) loading said interface with menu information relating to the types of data selectively available to said user terminal;
   (h) displaying said menu information; and
   (i) entering menu related requests at said user terminal, and
   wherein said reporting step (f) comprises the step of reporting data retrieved in accordance with said menu request.

3. The method of claim 2 wherein said step (h) of displaying comprises the step of displaying said menu information on a user terminal screen.

4. The method of claim 3 and wherein said step (f) of reporting said data comprises displaying the reformatted data on said user terminal screen.

5. The method of claim 3 and wherein said step (f) of reporting said data comprises the step of printing out said reformatted data in a predetermined copy form.

6. The method of claim 2 wherein said intelligent interface comprises a file driven program residing in digital computer apparatus and wherein said information for coupling to and retrieving data from said data processors as well as said menu information is located in a plurality of data files, said program further executing a plurality of instructional sets in response to said information loaded into said files.

7. The method of claim 6 wherein said plurality of instructional sets comprise a plurality of Pascal type modules controlled by said files.

8. The method of claim 7 wherein one of said modules termed a Scheduler module executes all other of said modules.

9. The method of claim 8 wherein said other modules include at least a User Interface module which controls all inputs and outputs to and from said user terminal, a Command Interpreter module which causes said other modules to perform specific tasks via the Scheduler module, a Communications module which emulates asynchnous terminal communications between each of said data processors and said interface, and a Merge/Format module which operates to temporarily store the data retrieved from said data processors via the Communications module, consolidate the data retrieved in a common format and output the data to said user terminal via said User Interface module.

10. The method of claim 9 and wherein said modules additionally include an Error Handling function which operates to translate any communications error into a user format.

11. The method of claim 9 wherein said modules additionally include a Logging module for recording the status of the program's execution as it progresses.

12. The method of claim 6 wherein said information loaded into said data files includes: (i) user information comprising the identity of the accessing user, user passwords, user access capabilities, data categories available to a particular user and the language dialogue for a particular user; (ii) interface information comprising the manner in which connection to said data processors can be made and including local area network access, automatic telephone dialing, the particular logon information to said data processors where said predetermined data resides, the passwords and user identification to logon in order to access the data and processor logoff information; (iii) data retrieval information comprising information on the structure of the data to be retrieved, the query language available to access the data and the requirements to access or invoke and format a request for data, and the specific query language; and (iv) data manipulation and output format information comprising functions to be applied against the data retrieved, the manner in which to format the data into report format, the manner to summarize the data, and the manner to format the data.

13. Apparatus for integrating data in a distributed processing environment and comprising:
  (a) at least one user terminal adapted to interact with a data processor;
  (b) a plurality of data processors;
  (c) an intelligent interface coupled between said user terminal and said plurality of data processors, said intelligent interface further comprising:
    (i) means containing information for emulating and coupling to and retrieving data from each of said data processors;
    (ii) means for operating said interface as an asynchronous terminal in accordance with said information;
    (iii) means for selectively coupling to and accessing said data processors for predetermined data via a respective communications link;
    (iv) means for retrieving and returning said predetermined data from said data processors to said interface via said respective communications links;
    (v) means for integrating said data retrieved from said plurality of data processors at said interface; and
    (vi) means for reporting said data thus integrated to said user terminal in a user friendly form.

14. The apparatus of claim 13 wherein said plurality of data processors are comprised of mutually diverse type data processors.

15. The apparatus of claim 14 wherein said integrating means (v) comprises means for consolidating the data retrieved from said diverse type processors and means for reformatting the retrieved data into a common format.

16. The apparatus of claim 15 wherein said intelligent interface further includes:
  (vii) means containing menu information relating to the types of data selectively available to said user terminal; and said apparatus additionally comprises:
  (c) means for displaying said menu information; and
  (d) means for entering menu related requests at said use terminal.

17. The apparatus of claim 16 wherein said reporting means (vi) comprises means for reporting data retrieved in accordance with said menu request.

18. The apparatus of claim 16 wherein said means (c) for displaying comprises a user terminal screen.

19. The apparatus of claim 18 wherein said means (vi) for reporting said data comprises means for coupling the reformatted data to said user terminal screen for display.

20. The apparatus of claim 18 wherein said means (vi) for reporting said data comprises means for printing out said reformatted data in a predetermined copy form.

21. The apparatus of claim 16 wherein said intelligent interface comprises a file driven program residing in digital computer apparatus and wherein said information for emulating, coupling to and retrieving data from said data processors as well as said menu information is located in a plurality of data files, and said means (ii) through (vi) comprises a plurality of instructional sets executed in response to said information loaded into said files.

22. The apparatus of claim 21 wherein said plurality of instructional sets comprise a plurality of Pascal type modules controlled by said files.

23. The apparatus of claim 22 wherein one of said modules termed a Scheduler module executes all other of said modules.

24. The apparatus of claim 23 wherein said other modules at least comprise a User Interface module which controls all inputs and outputs to and from said user terminal; a Command Interpreter module which causes said other modules to perform specific tasks via the Scheduler module; a Communications module which emulates asynchronous terminal communications between each of said data processors and said interface; and a Merge/Format module which operates to temporarily store the data retrieved from said data processors via the Communications module, consolidate the data retrieved in a common format and output the data to said user terminal via said User Interface module.

25. The apparatus of claim 24 wherein said modules additionally comprise an Error Handling function which operates to translate any communications error into a user format.

26. The apparatus of claim 24 wherein said modules additionally comprise a Logging module for recording the status of the program's execution as it progresses.

27. The apparatus of claim 23 wherein said files are located in an Information Directory and comprise:
  (1) a first file termed a Security File which contains the user name, password, the next module to be executed by said Scheduler module and the first command to be executed by said next module;
  (2) a second file termed a Menu File which contains a plurality of screen images for a plurality of menus for said user terminal and wherein each menu is indicative of the type of data which can be obtained at said us terminal;
  (3) a third file termed a User Command Stream File, which contains the sequence of instructions to be followed when a specific menu request is made from a user terminal;

(4) a fourth file termed the Application Command Stream File which contains a plurality of processes which execute the instructions necessary to complete a logical task;

(5) a fifth file termed a Condition File which contains entries which compares incoming data against expected data, compares an internally maintained counter to a value that is specified in the file, and upon successful comparison dictates the process by the next module and command associated with a particular comparison;

(6) a sixth file termed a Graph File which contains the information needed for the generation of a graphic output format for the integrated data retrieved.

* * * * *